United States Patent
Seo (10) Patent No.: US 8,457,914 B2
(45) Date of Patent: Jun. 4, 2013

(54) APPARATUS AND METHOD FOR OBTAINING PHASE CORRESPONDING TO OBJECT POSITION

(75) Inventor: Yuzo Seo, Kamakura (JP)

(73) Assignee: Canon Kabushiki Kaisha (JP)

( * ) Notice: Subject to any disclaimer, the term of this patent is extended or adjusted under 35 U.S.C. 154(b) by 171 days.

(21) Appl. No.: 12/958,471

(22) Filed: Dec. 2, 2010

(65) Prior Publication Data

US 2011/0134984 A1 Jun. 9, 2011

(30) Foreign Application Priority Data

Dec. 3, 2009 (JP) ................................. 2009-275648

(51) Int. Cl.
*H04B 17/00* (2006.01)
(52) U.S. Cl.
USPC .................. 702/77; 702/70; 702/71; 702/72; 375/226
(58) Field of Classification Search
USPC ............. 702/57, 66, 70–72, 77, 94, 150–153; 375/226
See application file for complete search history.

(56) References Cited

U.S. PATENT DOCUMENTS

| 4,458,322 A | 7/1984 | Veale |
| 5,581,488 A | 12/1996 | Seo |
| 7,792,653 B2 * | 9/2010 | Grupp et al. ..................... 702/94 |
| 2003/0160160 A1 | 8/2003 | Taniguchi et al. |
| 2006/0052973 A1 * | 3/2006 | Hiller ............................ 702/150 |

FOREIGN PATENT DOCUMENTS

| JP | 1-933273 C | 5/1995 |
| JP | 2003-254785 A | 9/2003 |

* cited by examiner

*Primary Examiner* — Sujoy Kundu
(74) *Attorney, Agent, or Firm* — Rossi, Kimms & McDowell LLP (57) ABSTRACT

The apparatus corrects multi-phase signals for detecting a position of an object and obtains a phase corresponding to the position of the object. The apparatus includes a correcting unit correcting the multi-phase signals with error coefficients, respectively, a phase calculating unit performing calculation for the corrected multi-phase signals to obtain the phase, a regression unit performing regression for the calculated phases to obtain reference phases, a Fourier transform unit respectively performing Fourier transform for the corrected multi-phase signals whose phases having been respectively changed into the reference phases, and an updating unit updating, using Fourier coefficients obtained by the Fourier transform unit, the error coefficients respectively corresponding to the Fourier coefficients. The updating unit updates the error coefficients if a regression error in the regression performed by the regression unit satisfies a predetermined condition.

7 Claims, 3 Drawing Sheets

APPARATUS AND METHOD FOR OBTAINING PHASE CORRESPONDING TO OBJECT POSITION

BACKGROUND OF THE INVENTION

1. Field of the Invention

The present invention relates to an apparatus and a method that corrects multi-phase signals for detecting a position of an object and obtains a phase corresponding to the position of the object. The present invention is applicable to, for example, an encoder, a laser interferometer or the like.

2. Description of the Related Art

After converting such multi-phase signals (analog signals) such as two-phase signals into digital signals by an A/D converter, performing arc-tangent calculation thereon enables acquisition of minute position information. AD converters include ones having a resolution of 12 to 18 bits, and use of such AD converters enables acquisition of position information corresponding to one several thousandth to one several hundred thousandth of one period of the two-phase signals. However, the position information thus acquired contains (a) an error caused due to a distortion component included in the two-phase signals on the basis of which the position information is acquired and (b) drift in a signal processing circuit.

U.S. Pat. No. 4,458,322 discloses a method for removing an error contained in two-phase signals. This method measures an offset error and an amplitude error (that is, mismatched correlation) by using a maximum value and a minimum value of each of the two-phase signals and then corrects the errors.

Moreover, U.S. Pat. No. 5,581,488 discloses a method for detecting and correcting errors other than the offset error (zeroth-order error component) and the amplitude error (first-order error component) by using maximum and minimum values of each of a sum signal and a difference signal of the two-phase signals in addition to the maximum and minimum values of each of the two-phase signals. This method measures and corrects a phase difference error (an error from $\pi/2$ that is a phase difference between phases of the two-phase signals), a second-order distortion and a third-order distortion in addition to the offset error and the amplitude error.

Error components contained in a position signal include low-order error components and high-order error components which become non-negligible with subdivision of signals by digital processing. However, the conventional error measuring method using the maximum and minimum values of the two-phase signals corresponds to error measurement on the basis of information on a radius (Lissajous radius) of a figure (Lissajous figure or (Lissajous waveform) drawn as a trajectory of an intersection of the two-phase signals when the two-phase signals are allocated to respective axes of orthogonal coordinates. This method cannot measure the high-order error components in principle.

Specifically, Fourier expansion of the two-phase signals (x, y) can express these signals as the following expressions where a symbol $\Sigma$ represents a sum from k equals zero to infinity of values in brackets:

$$x = \cos\theta + \Sigma(a_k \cos k\theta + d_k \sin k\theta)$$

$$y = \sin\theta + \Sigma(e_k \cos k\theta + b_k \sin k\theta).$$

Moreover, a variation $R_k$ of the Lissajous radius due to kth-order error components ($a_k$, $d_k$, $e_k$, $b_k$) in A and B phase signals (two-phase signals) is shown by the following expression:

$$R_k = 0.5(a_k + b_k)\cos(k-1)\theta + 0.5(d_k - e_k)\sin(k-1)\theta + 0.5(a_k - b_k)\cos(k+1)\theta + 0.5(d_k + e_k)\sin(k+1)\theta.$$

As clear from the above expression, the kth-order error component included in the two-phase signals causes (k+1)th-order and (k−1)th-order periodic error components of the Lissajous radius. Therefore, analysis of the variation of the Lissajous radius cannot distinguish whether that variation is caused due to an effect of the (k+1)th-order error component or the (k−1)th-order error component, which makes it impossible to specify error factors included in the position signal.

A reason that the conventional error measuring method using the maximum and minimum values of the two-phase signals is available is that the zeroth-order error component and the first-order error component have a special property which other order error components do not have.

Specifically, the method is available on the zeroth-order error component (offset error) because it includes no sine component, and a (k−1)th-order (that is, minus first-order) variation component of the Lissajous radius caused due to the zeroth-order error component appears by aliasing as a first-order variation component to overlap a (k+1)th-order variation component. However, when an original signal includes a second-order error component, this (k−1)th-order variation component appears as the first-order variation component of the Lissajous radius which cannot be separated. Therefore, this method is available when the second-order error component is negligible.

Furthermore, all variation components of the Lissajous radius caused due to the first-order error component (amplitude error) appears on a (k+1)th-order side since the amplitude errors $a_1$ and $b_1$ have a restricted relationship of $a_1 = -b_1$ and the phase difference errors $d_1$ and $e_1$ have a restricted relationship of $e_1 = d_1$.

In more detail, an influence of the error component given to a phase error (or Lissajous radius error) is expressed by the following expression showing an inner product of an error vector and a tangential unit vector (or radial unit vector):

$$(a_k \cos k\theta + d_k \sin k\theta, e_k \cos k\theta + b_k \sin k\theta) \cdot (-\sin\theta, \cos\theta).$$

Multiplying the kth-order error component by a sine function generates plus and minus first-order error components.

Therefore, it becomes possible to specify the first-order error component contained in the original signal from the second-order variation component of the Lissajous radius. However, also in this case, the (k−1)th-order variation component due to a third-order error component contained in the original signal appears as the second-order variation component of the Lissajous radius which cannot be separated.

The measurements of the zeroth-order and first-order error components using the Lissajous radius are performed based on a premise that the original signal does not contain second- or higher-order error components. The method disclosed in U.S. Pat. No. 5,581,488 predetermines second- and third-order error components based on a presumption that a distortion of a signal processing circuit contains only an error component whose peak coincides with that of a fundamental wave component, enabling measurements of the respective order error components. However, this presumption is only approximately true, which is insufficient to detect and correct the entire error components included in the two-phase signals.

Japanese Patent No. 1933273 discloses a method for detecting and correcting error components by Fourier transform of each of two-phase signals. This disclosed method measures a phase of a signal from a measurement apparatus in a state where the measurement apparatus is fixed at a predetermined angle by using an angle setter such as a micrometer, to calculate the error components. Such a configuration is not suitable for automatic measurement of errors of the measurement apparatus during actual use thereof.

Japanese Patent Laid-Open No. 2003-0254785 discloses a method of calculating, based on a fact that phase information calculated from two-phase signals linearly varies with movement of a scale at a constant speed, a deviation from the line as an error. However, since Japanese Patent Laid-Open No. 2003-0254785 does not disclose that error correction is performed with a general expression (polynomial expression) focusing on coefficients of high-order distortion components, and only discloses that extraction of error correction data and correction are performed separately from each other, the error may be corrected insufficiently.

In order to perform more highly accurate error correction, it is firstly necessary to calculate coefficients of high-order error components to enable the error correction using a general expression (polynomial expression), and secondly necessary to provide an algorithm enabling continuous and successive calculation of the coefficients of the high-order error components and correction thereof.

Applying the method disclosed in Japanese Patent No. 1933273 which performs the Fourier transform on each of the two-phase signals enables independent measurement of amplitude coefficients of high-order errors, which seems to be able to be used as it is for a purpose of automatic measurement and correction of the errors during actual use of the apparatus.

However, in this case, how phase information used for the Fourier transform is obtained is a problem.

In general, it is desirable that error components contained in the two-phase signals be very few (for example, 1% or less of signal amplitude). Therefore, phase information obtained by performing arc-tangent calculation on the two-phase signals containing the error components seems to be able to be used for this purpose.

However, the phase information thus obtained contains a phase error caused due to the error component contained in the input two-phase signals (error of a result value of the arc-tangent calculation). As a result, the Fourier transform is performed with the phase error.

That is, although Fourier transform is performed by multiplying a signal by $\sin k\theta$ and $\cos k\theta$ and then integrating the product thereof over one period in principle, an error contained in $\theta$ (phase) generates an error in a process of the Fourier transform.

A synergetic effect of fundamental wave components (a1, b1, a2, b2, a3, b3, . . . ) of the two-phase signals and phase error involvement components (d1, e1, d2, e2, d3, e3, . . . ) causes a false (spurious) error component of the phase $\theta$ in a result of the Fourier transform.

A detailed description will hereinafter be made of this phenomenon.

The kth-order error component causes a phase error $\delta_k$ expressed by the following expression (characters are same as those in the above description). The following expression shows that a kth-order distortion component of the two-phase signals becomes (k−1)th- and (k+1)th-order periodic error components.

$$\delta_k = ((a_k+b_k)/2)\sin(k-1)\theta + ((e_k-d_k)/2)\cos(k-1)\theta + ((b_k-a_k)/2)\sin(k+1)\theta + ((d_k+e_k)/2)\cos(k+1)\theta$$

When the phase contains the error $\delta_k$, an extracted signal includes an error corresponding to a product of a differential coefficient for the phase of the signal and $-\delta_k$. Spurious errors resulting therefrom are expressed as follows when approximation is made with neglecting square or higher terms of the error coefficient.

The error overlapping a cosine signal is expressed by the following expression:

$$\delta_k \sin\theta = -(a_k/2)\cos k\theta - (d_k/2)\sin k\theta + ((a_k+b_k)/4)\cos(k-2)\theta - ((e_k-d_k)/4)\sin(k-2)\theta + ((a_k-b_k)/4)\cos(k+2)\theta + ((e_k+d_k)/4)\sin(k+2)\theta.$$

The error overlapping a sine signal is expressed by the following expression:

$$-\delta_k \cos\theta = -(e_k/2)\cos k\theta - (b_k/2)\sin k\theta - ((e_k-d_k)/4)\cos(k-2)\theta - ((a_k+b_k)/4)\sin(k-2)\theta - ((e_k+d_k)/4)\cos(k+2)\theta + ((a_k-b_k)/4)\sin(k+2)\theta.$$

That is, the phase error caused due to the error component contained in the two-phase signals compresses the originally existing error component into ½, and further generates a false error having a size of ¼ of the originally existing error component and being away therefrom by plus and minus second orders.

Table 1 and Table 2 show sizes of the false errors (spurious errors) generated due to the error components ($a_k$, $d_k$, $e_k$, $b_k$) of the respective orders. Table 1 shows $a_k$ and $b_k$, and Table 2 shows $d_k$ and $e_k$. Table 1 considers only the error components $a_k$ and $b_k$ relating to the amplitude error, and Table 2 considers only the error components $d_k$ and $e_k$ relating to the phase error. However, neither $a_k$ nor $b_k$ of the error components contained in the original signal do not influence $d_k$ and $e_k$ to be measured, and neither $d_k$ nor $e_k$ of the error components contained in the original signal do not influence $a_k$ and $b_k$ to be measured.

Since amounts of false error components with respect to those of true error components are known, predetermined inverse matrices of Table 1 and Table 2 enable inverse calculation of the error components contained in the original signal from the measured error components. However, a matrix generating the false error component is a singular matrix, and therefore it has no inverse matrix. Accordingly, it is impossible to analytically calculate, by using the periodic error of the Lissajous waveform, the kth-order distortion components ($a_k$, $d_k$, $e_k$, $b_k$) where k is for example from 0 to 6.

SUMMARY OF THE INVENTION

The present invention provides, for example, an apparatus and a method advantageous in terms of error correction precision.

The present invention provides as one aspect thereof an apparatus that corrects multi-phase signals for detecting a position of an object and obtains a phase corresponding to the position of the object. The apparatus includes a correcting unit configured to correct the multi-phase signals with error coefficients, respectively, a phase calculating unit configured to perform calculation for the corrected multi-phase signals to obtain the phase, a regression unit configured to perform regression for the calculated phases to obtain reference phases, a Fourier transform unit configured to respectively perform Fourier transform for the corrected multi-phase signals whose phases having been respectively changed into the reference phases, and an updating unit configured to update, using Fourier coefficients obtained by the Fourier transform unit, the error coefficients respectively corresponding to the Fourier coefficients. The updating unit is configured to update the error coefficients if a regression error in the regression performed by the regression unit satisfies a predetermined condition.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Figure 1:
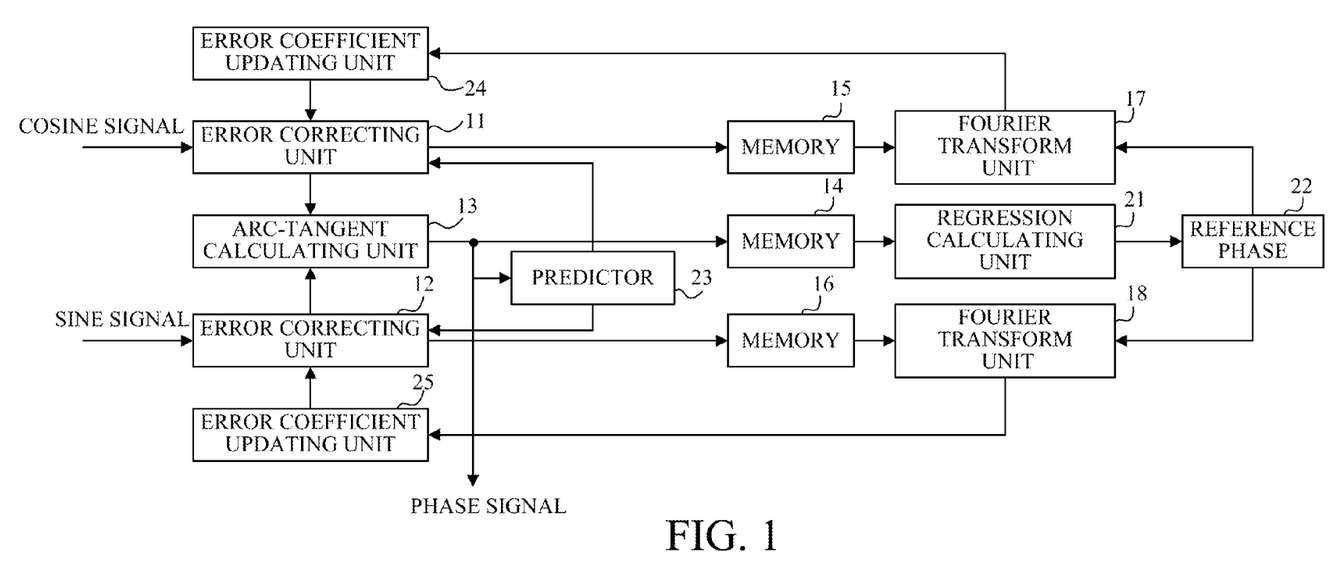
FIG. 1 is a block diagram showing a configuration of a position signal correction apparatus that is an embodiment of the present invention.

FIG. 1 shows a configuration of a position signal correction apparatus that is an embodiment of the present invention. To the apparatus, two-phase digital signals (two-phase input signals as multi-phase signals) are input, which correspond to two-phase periodic signals having a phase difference and being output from a position detector such as an encoder or a laser interferometer which is used for detecting a position of an object whose position is to be detected. The two-phase periodic signals are analogue signals, and hereinafter also referred to as "position signals". The two-phase periodic signals from the position detector are subjected to electronic processing such as amplification and filtering, and then converted into digital signals to be input to an error correcting units 11 and 12 as a cosine signal ($x_{in}$) and a sine signal ($y_{in}$), respectively. These cosine and sine signals are also collectively referred to as "two-phase signals", and each of the cosine and sine signals are also referred to as "each phase signal".

The error correcting units 11 and 12 perform error correction calculation by the following expressions on the cosine signal ($x_{in}$) and the sine signal ($y_{in}$), respectively, so as to remove known errors therefrom:

$$x = x_{in} - s\Sigma(A_k \cos k\theta + D_k \sin k\theta)$$

$$y = y_{in} - s\Sigma(E_k \cos k\theta + B_k \sin k\theta)$$

where, s represents amplitude of each signal which is expressed by the following expression:

$$s = \sqrt{(x^2 + y^2)}.$$

$A_k$, $D_k$, $E_k$ and $B_k$ represent kth-order error coefficients which are obtained by previous calculation for error measurement, their initial values being 0. The error coefficients $A_k$, $D_k$, $E_k$ and $B_k$ are sequentially corrected by kth-order error coefficient correction values $a_k$, $d_k$, $e_k$ and $b_k$ which will be described later. Moreover, $\theta$ represents a predictive phase for a latest sample, which is obtained by processing performed by a predictor 23 with a Kalman filter on information of a previous phase calculated by an arc-tangent calculating unit 13.

Figure 2:
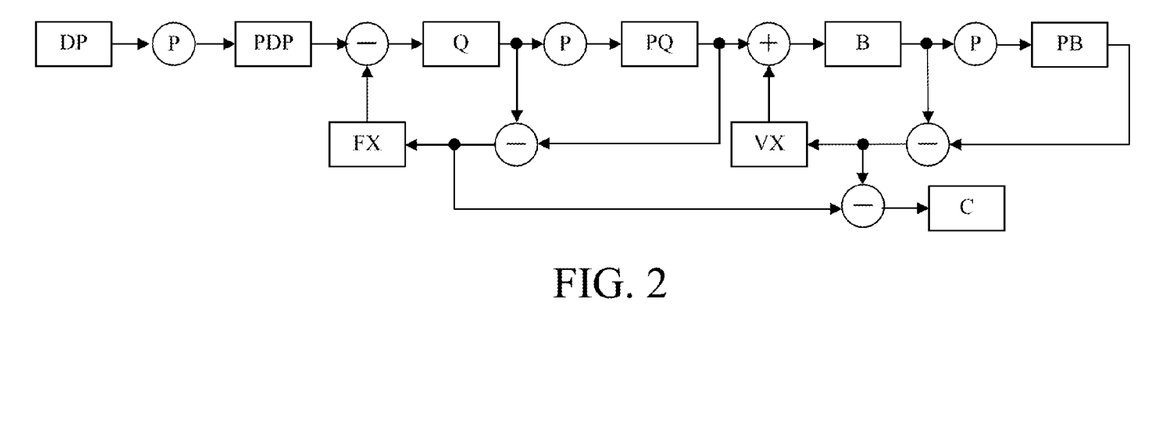
FIG. 2 is a block diagram showing a configuration of a Kalman filter used in the embodiment.

FIG. 2 shows a configuration of the Kalman filter. DP denotes a change amount of the latest phase with respect to the previous phase. The change amount DP is multiplied by P, which $2^{-n}$ in this embodiment, to be shifted to the right by predetermined n bits and then stored in a register PDP. A value resulting from subtraction of the value of the register PDP from a value of a register FX is stored in a register Q.

Next, a value resulting from multiplication of the value of the register Q by P to be shifted to the right by n bits is stored in a register PQ. Moreover, a value resulting from subtraction of the value of the register PQ from the value of the register Q is stored in a register FX.

A value resulting from addition of a value of a register VX to the value of the register PQ is stored in a register B. The value of the register B corresponds to an average change amount of the phases sampled at plural timings, and is used for predicting a phase at a subsequent sampling timing.

A value resulting from multiplication of the value of the register B by P to be shifted to the right by n bits is stored in a register PB, and a value resulting from subtraction of the value of the register PB from the value of the register B is stored in a register VX.

A value C resulting from subtraction of the value of the register VX from the value of the register FX is set to a constant term of a regression expression. This constant term means noise contained in the phase measured last.

Removing the noise from the phase measured last by using the constant term and then adding thereto the value B that is the average change amount in a sampling interval (measurement interval), which corresponds to a movement amount or speed, can calculate the predictive phase value at the subsequent sampling timing.

The calculations in the Kalman filter are performed, when a phase change amount $\Delta x$ is obtained, by using the values FX and VX held in that filter as the following expressions. These calculations provide the speed B and the noise C, and the values FX and VX held thereinside are updated. A value with "'" means that the value is a previously calculated value. Moreover, P denoting $2^{-n}$ is a weight coefficient for a latest phase angle. Normally, a value of n of about 4 to 6 provides sufficient accuracy.

$$Q = FX' - P\Delta x$$

$$B = VX' + PQ$$

$$VX = (1-P))B$$

$$FX = (1-P))Q$$

$$C = FX - VX$$

In FIG. 1, the arc-tangent calculating unit 13 performs arc-tangent calculation on the corrected two-phase signals (that is, the two-phase input signals after the error correction calculation) output from the error correcting units 11 and 12 to convert the corrected two-phase signals into phase information (in other words, to generate phase information). The phase information and the corrected two-phase signals are accumulated in memories 14, 15 and 16 at least one period of each phase signal. When the movement amount is small with respect to the measurement interval, it is also possible to accumulate reduced samples of the phase information and corrected two-phase signals in each memory. In order to achieve accuracy sufficient to estimate high-order error components, it is desirable that the number of the samples accumulated in each memory be from one hundred points to several hundred points.

Next, a regression calculating unit 21 performs regression calculation on the phase information accumulated in the memory 14 to output a regression predictive value obtained by the regression calculation as a reference phase 22. Since Fourier transform calculation being performed by Fourier transform units 17 and 18, which will be described later, are performed within a range of integral multiples (2 mπ where m represents a natural number) of a signal period, it is desirable that the regression calculation be performed on the phase information in the same range. The regression calculation may be linear regression in normal cases, or may be calculation using a regression expression corresponding to a straight line simply connecting a starting point and an ending point in a case where the signal contains only a small noise. The regression expression includes an independent variable as a memory address, and predicts the phase by substitution of the memory address.

The regression calculating unit 21 and the Fourier transform units 17 and 18 constitute a regression calculating/Fourier transform unit.

Next, the Fourier transform units 17 and 18 perform the Fourier transform calculation on the corrected two-phase signals accumulated in the memories 15 and 16 using the reference phase 22. As an algorithm of the Fourier transform calculation, an FFT (fast Fourier transform) algorithm is known. However, for the Fourier transform calculation to calculate high-order error components contained in the two-phase signals, since the number of orders is small (normally, 10 or less) and sample points equally dividing the signal period are not obtained, it is desirable to perform Fourier transform by numerical integral.

In order to perform the Fourier transform by numerical integral, the following integration is performed within a range of integral multiples of the signal period (0 to 2 mπ in phase). In the following expressions, a function t(i) denotes a predictive value of the phase given by the regression expression for a memory address i. Moreover, a symbol Σ shows integration in a range from a second memory address of the Fourier transform range to the ending point thereof.

$a_k = \Sigma\{((x[i-1]+x[i])/2)\cos(k(t(i-1)+t(i))/2)(t(i)-t(i-1))\}$ $d_k = \Sigma\{((x[i-1]+x[i])/2)\sin(k(t(i-1)+t(i))/2)(t(i)-t(i-1))\}$ $e_k = \Sigma\{((y[i-1]+y[i])/2)\cos(k(t(i-1)+t(i))/2)(t(i)-t(i-1))\}$ $b_k = \Sigma\{((y[i-1]+y[i])/2)\sin(k(t(i-1)+t(i))/2)(t(i)-t(i-1))\}$ The phase of the ending point of the integration is required to be accurately separated from the starting point by 2 mπ. Therefore, when t(i) exceeds the ending point, it is desirable to perform the above-described calculation by using a value resulting from addition of 2 mπ to the phase at the starting point, in place of t(i). As for a signal value at the ending point, interpolation calculation using the values accumulated in the memory can provide an accurate signal value. However, since an error of the signal value at the ending point provides less influence on the calculation result than an error of the phase, a signal value exceeding the ending point may be used as it is.

It is desirable that table data of values of the sine function and the cosine function be stored in a ROM and be read therefrom.

After completion of calculation by the Fourier transform of the error coefficient correction values $a_k$, $d_k$, $e_k$ and $b_k$ which are Fourier coefficients, error coefficient updating units 24 and 25 normalize the error coefficient correction values $a_k$, $d_k$, $e_k$ and $b_k$ by using amplitude s so as to exclude signal amplitude influence on the all error coefficient correction values. The amplitude s is given as an average value of first-order Fourier coefficients $a_1$ and $b_1$ as follows:

$s = (a_1 + b_1)/2.$

The normalization is made by dividing the all error coefficient correction values $a_k$, $d_k$, $e_k$ and $b_k$ by s as follows:

$a_k = a_k/s$ $d_k = d_k/s$ $e_k = e_k/s$ $b_k = b_k/s.$

The first-order Fourier coefficients $a_1$ and $b_1$ contain a fundamental wave component, and therefore 1 is subtracted therefrom. Moreover, $d_1$ and $e_1$ are phase difference errors, which are required to be equal to each other because a difference between $d_1$ and $e_1$ moves a zero point of the phase. Thus, an average value of $d_1$ and $e_1$ is set to both $d_1$ and $e_1$.

Finally, the error coefficient updating units 24 and 25 revise (correct) the error coefficients $A_k$, $D_k$, $E_k$ and $B_k$ held thereinside by using the error coefficient correction values $a_k$, $d_k$, $e_k$ and $b_k$ to update the error coefficients held thereinside to more appropriate ones. It is preferable that the revision (correction) be made partially by using a parameter P of 0 or more and less than 1 as shown by the following expressions:

$A_k = A_k + Pa_k$ $D_k = D_k + Pd_k$ $E_k = E_k + Pe_k$ $B_k = B_k + Pb_k.$

The parameter P may be a constant value, but it is desirable to determine the parameter P by utilizing a method using the following expression including an error variance $V_N$ in the regression calculation of the phase, this method being described in U.S. Pat. No. 4,488,117:

$P = (V_C + V_T)/(V_C + V_T + V_N).$ $V_C$ denotes a representative amount of the error variance of an estimated value, and is updated by the following expression after P is determined by the above expression (an initial value of P is 0):

$V_C = P^2 V_N + (1-P)^2 (V_C + V_T).$ $V_T$ denotes a representative amount of change with time of the error coefficient, and is able to be arbitrarily determined such that change with time of a held value of the error coefficient becomes a smooth change. Specifically, a small value of $V_T$ makes the change with time smooth to suppress noise influence, but makes responsiveness to variation of the error worse.

When the speed is not constant, the phase predicted by the linear regression contains a large error. In this case, since $V_N$ is extremely large, the parameter P becomes a very small value, and thereby the error coefficient held inside is hardly changed. Since a ratio of $V_N$ to $V_C$ determines a contribution degree, a small error variance $V_C$ being expected for the error coefficient held inside also makes P small.

Figure 3:
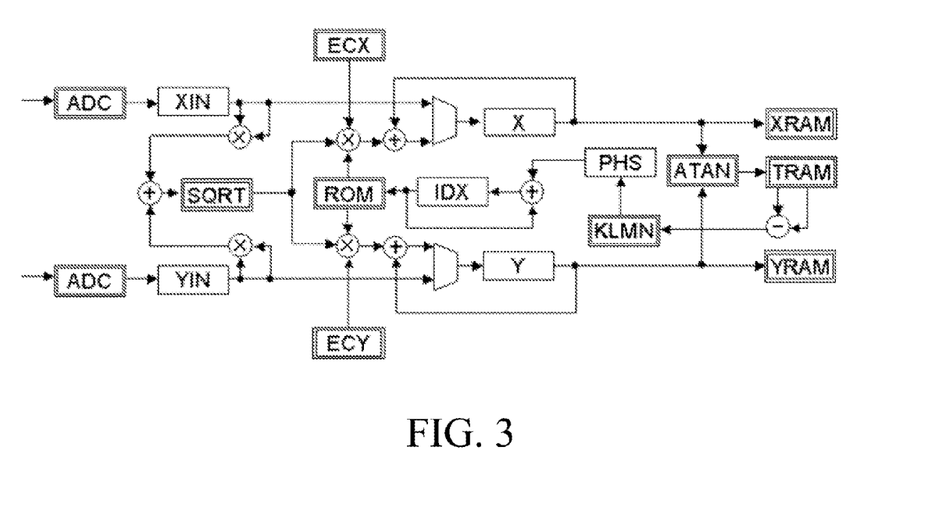
FIG. 3 is a block diagram showing a configuration of an error correcting unit in the embodiment.

FIG. 3 shows an exemplary configuration of the error correcting units 11 and 12 shown in FIG. 1. The error correcting units 11 and 12 are constituted by using FPGA (Field Programmable Gate Array) because of requirement of high-speed processing.

The two-phase periodic signals that have been output from the above-described position detector and subjected to predetermined electronic processing are converted into digital signals by an analogue-to-digital converter (ADC). The respective two-phase digital signals are stored to registers XIN and YIN in the error correcting units 11 and 12. Values in both the registers XIN and YIN are respectively squared by multipliers (×), a sum of squares thereof is calculated by an adder (+) and then a square-root of sum of squares is calculated by a square root extraction module SQRT.

Figure 4:
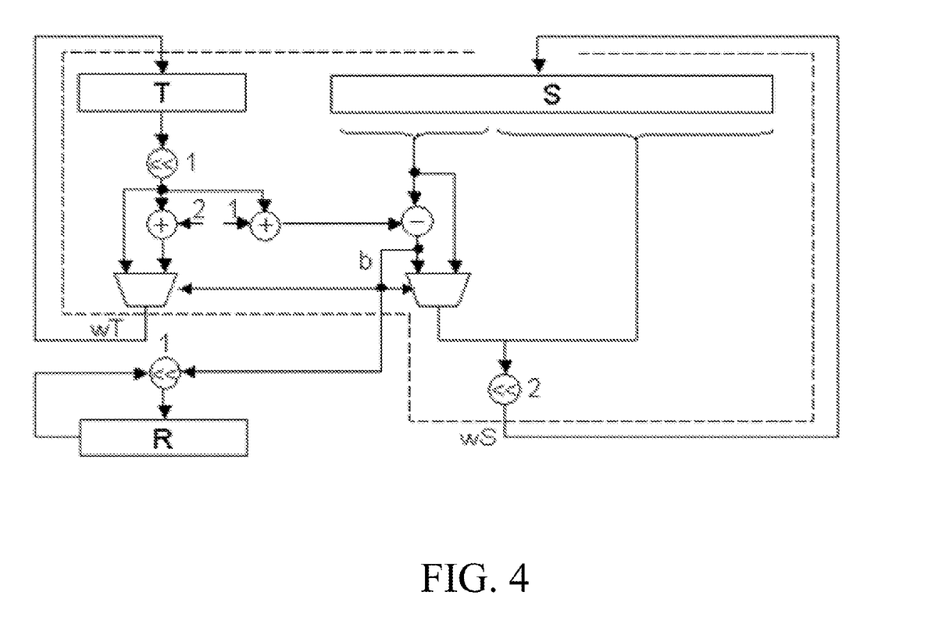
FIG. 4 is a block diagram showing a configuration of a square root extractor used in the embodiment.

FIG. 4 shows details of the square root extraction module SQRT. A working register T and a result storing register R are initialized to 0. A register S is a register where an input value is stored and a margin is provided for high bits. For example, when calculating a square root of 16 bits from an integer of 32 bits, a margin of high 14 bits (initialized to 0) is provided, and the input value is stored in low 32 bits. In this case, the register T and the register R are provided with a 16 bit length.

The square root extraction for the above-described bit length proceeds as follows. At first, a value resulting from one-bit left shift of the register T and addition of 1 thereto is subtracted from high 16 bits of the register S. In a case where a borrow (that is, a carry-down which is generated when a subtraction result is a minus value) is generated in the subtraction, a value resulting from two-bit left shift of the value in the register S is output to a signal line wS, and a value resulting from one-bit left shift of the value in the register T is output to a signal line wT.

In a case where the borrow is not generated in the subtraction, a value resulting from two-bit left shift of a value that results from concatenation of low 30 bits of the register S to a subtraction result is output to a signal line wS2, and a value resulting from one-bit left shift of the value in the register T and addition of 2 thereto is output to the signal line wT.

When the calculation is performed one bit by one bit, the value of the signal line wS is loaded into the register S, the value of the signal line wT is loaded into the register T and a shift-in of a signal resulting from inverse of the borrow is performed from low bits of the register R at each clock. Repeating such an operation 16 times completes the square root extraction of the 32 bit integer.

Series connection of the square root extraction modules enables simultaneous execution of the square root extraction for plural bits at one clock. In order to enable such series connection, it is only necessary to provide plural logic circuits each of which is shown by a dashed line in FIG. 4 and connect the signal lines (output lines) wT and wS to the registers T and S provided in a subsequent logic circuit, in place of connecting outputs from the registers T and S in the subsequent logic circuit. The borrow b may be output from the respective logic circuits independently, and shift-in of results of the plural bits into the result storing register may be performed collectively.

For example, in order to execute four-digit square root extraction at one clock, four logic circuits each of which is shown by the dashed line in FIG. 4 are connected in series, four-bit left shift of the result storing register is performed at each clock, and then values resulting from inverse of the borrow of each digit are set to low four bits. This completes 32-bit square root extraction in four clocks.

When a logic for performing the 32-bit square root extraction by a square root extraction module having a four-logic circuit configuration was installed to EP2S30F672C4 made by Altera Corporation, which is one example of FPGA, the upper limit clock frequency was 90 MHz.

General position measurement and control utilize an AD converter whose sampling frequency is from several hundred kHz to several MHz. Therefore, a signal processing clock rate of several ten MHz enables use of ten or more clock periods for processing of one AD conversion result, which makes it possible to configure a simple logic circuit using plural clocks in calculation.

In FIG. 3, the error coefficients of the respective orders are stored in RAMs shown by ECX and ECY. A product of each error coefficient and the square-root of sum of squares is calculated to be fit to the amplitude of the input signal, and the product is then multiplied by values of cos $k\theta$ and sin $k\theta$ sequentially read from a ROM to calculate an error of the signal corresponding to each error coefficient.

Signal values XIN and YIN are respectively set to a register X and a register Y at a first clock. Next, at each calculation of the errors of the signals corresponding to each error coefficient, the errors are added to the values in the registers X and Y.

After completion of addition of the errors for the respective orders, the values in the registers X and Y are stored in RAMs shown by XRAM and YRAM in FIG. 3 while changing addresses therein at each sampling. Moreover, arc-tangent calculation ATAN is performed by using each signal, and a result thereof is stored in a RAM shown by TRAM in FIG. 3. Each of these RAMs is required to store a sufficient number of the sampling results (for example, 1 k sampling results) for the error calculation, and therefore is provided with an area sufficient to store them.

A difference between latest and previous result values of the arc-tangent calculation is introduced to a module KLMN. In the module KLMN, the above-described Kalman filter calculation is performed to calculate the phase $\theta$ for subsequent sampling. The phase $\theta$ is once stored on a register PHS, and then is added to a register IDX. The register IDX is first initialized to zero, and then the register PHS is sequentially added thereto. This generates an address $k\theta$ necessary for the error calculation of each order.

In FIG. 3, ECX and ECY for storing the error coefficients, XRAM and YRAM for storing a series of positions, and TRAM for storing a series of phase information are constituted by a dual port RAM (random-access memory having two reading and writing ports). One port of the dual port RAM is accessed by the logic of the above-described FPGA. Moreover, the other port is connected to an error coefficient updating system constituting each part shown in FIG. 1 other than the error correcting units 11 and 12, the error coefficient updating system being constituted by a microprocessor, a digital signal processor, a host computer or the like. The error coefficient update system reads the values from XRAM, YRAM and TRAM to perform the above-described regression calculation, the Fourier transform calculation and the updating calculation of the error coefficients, and writes the results thereof to ECX and ECY.

Generally, operation of the error coefficient updating system is very slower than that of the FPGA. However, since variation of the error coefficient is gradual, the updating processing thereof does not require a fast speed. Therefore, it is desirable to omit useless calculations as much as possible so as to effectively use calculation capability of the error coefficient updating system for the updating processing of the error coefficients.

Figure 5:
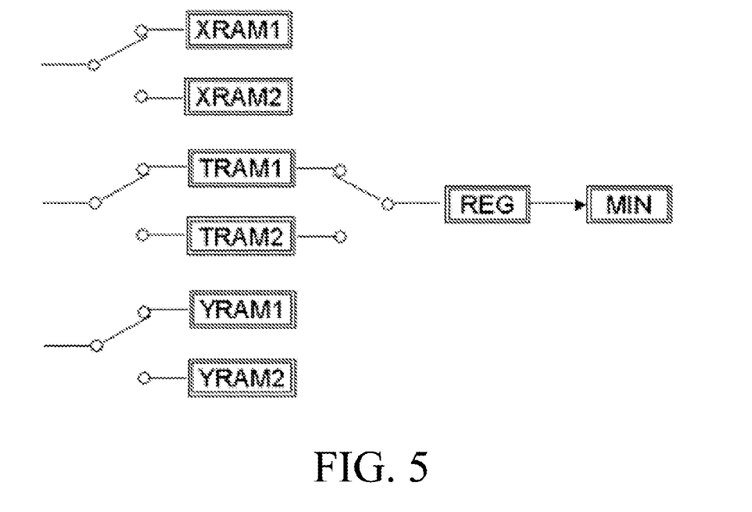
FIG. 5 schematically shows a configuration of a memory used in the embodiment.

This embodiment obtains the reference phase by the regression calculation (linear regression) based on a presumption that a moving speed of the object whose position is to be detected is constant. Therefore, a large variation of the moving speed during a data sampling period generates a large error in the calculation result of the error coefficient. Thus, it is desirable to provide to a logic of the FPGA a function of storing highly effective data. FIG. 5 shows one example of a circuit configuration for achieving such a function.

In FIG. 5, two RAM sets for storing data of the phase information (phase data) are provided. A group of best phase data (that is, data whose linear regression error of the phase is minimum) is stored in one of the RAM sets, and new phase data is accumulated in the other of the RAM sets.

From TRAM in which the new phase data is accumulated, the phase data in phase ranges corresponding to plural periods (for example, phase ranges corresponding to 32 points) are read. Then, the linear regression is performed by a linear regression module REG to calculate the regression error. This regression calculation may be performed on the entire area of the RAM.

The regression error is compared by a module MIN with the stored minimum regression error. Then, when a newly calculated regression error is smaller than the minimum regression error, the newly calculated regression error is set to the minimum regression error, and the RAM area where the new data is accumulated and the RAM area where the best data is stored are switched.

Read of the data from the RAM by the above-described error coefficient updating system is performed on the best data group, and the switch of the RAM areas is stopped while the data is read. Moreover, after the RAM data is read by the error coefficient updating system, the minimum regression error is reset (that is, a latest regression error is set to the minimum regression error).

Such operations enable the error coefficient updating system to read the best data group that has been stored after the previous data reading, which makes it possible to effectively measure the error coefficient.

Figure 6:
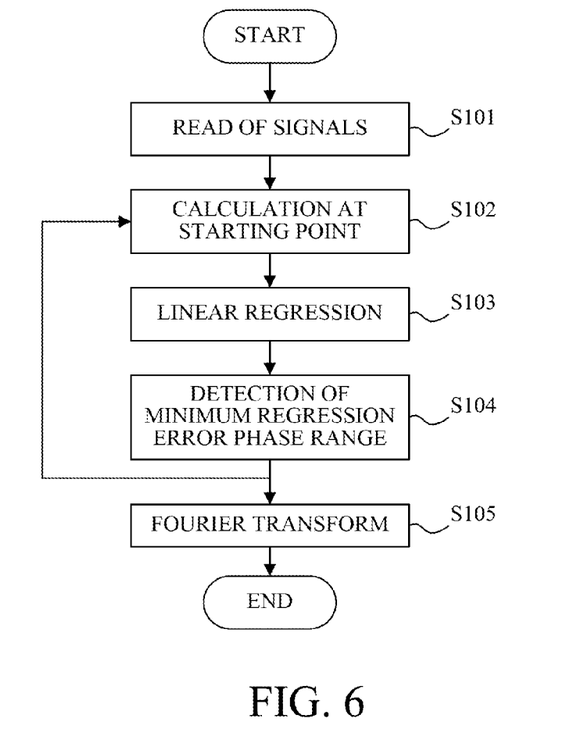
FIG. 6 is a flowchart showing processing in the embodiment.

A flowchart of FIG. 6 shows processing of the error coefficient updating system (that is, a position signal correction method). The error coefficient updating system executes the following processing according to a computer program.

The error coefficient updating system reads the signals accumulated in the RAM of the FPGA through a communication line (step S101), and the regression calculating unit 21 performs the linear regression calculation on the phase information (steps S102 and S103).

The RAM has an excessive capacity for normal measurement so as to store necessary range data even when the moving speed is low. The regression calculating unit 21 uses such a capacity of the RAM to perform the linear regression on the entire phase ranges where the linear regression can be performed (phase ranges corresponding to plural periods), that is, ranges of $2 m\pi$ from the respective starting points (steps S102 and S103), and detects the phase range where the regression error is minimum (step S104). Then, the Fourier transform units 17 and 18 perform the Fourier transform calculation on the phase range where the regression error is minimum (step S105). Such calculation steps (steps S102 to S105) enable acquisition of higher calculation accuracy of the error coefficient correction value (that is, the updated error coefficient).

As described above, this embodiment performs the regression calculation on the two-phase signals to generate the reference phase, and corrects (updates) the error coefficient for performing the error correction calculation, by using the error coefficient correction value obtained by the Fourier transform with the reference phase. This enables reduction of a spurious error or a so-called false error relating to the Fourier transform, thereby makes it possible to accurately calculate and correct even a high-order error component (harmonic component). In a high-resolution encoder, a speed of a scale can be regarded as constant in a range of several periods adjacent to each other without special consideration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-275648, filed Dec. 3, 2009 which is hereby incorporated by reference herein in its entirety.

TABLE 1

| in | a0.0 | a1 − b1 | a2.0 | b2.0 | a3.0 | b3.0 | a4.0 | b4.0 | a5.0 | b5.0 | a6.0 | b6.0 |
|---|---|---|---|---|---|---|---|---|---|---|---|---|
| a0.0 | 1 | 0 | 0.5 | 0.5 | 0 | 0 | 0 | 0 | 0 | 0 | 0 | 0 |
| a1 − b1 | 0 | 1 | 0 | 0 | 0.5 | 0.5 | 0 | 0 | 0 | 0 | 0 | 0 |
| a2.0 | 0.5 | 0 | 0.5 | 0 | 0 | 0 | 0.25 | 0.25 | 0 | 0 | 0 | 0 |
| b2.0 | 0.5 | 0 | 0 | 0.5 | 0 | 0 | −0.25 | −0.25 | 0 | 0 | 0 | 0 |
| a3.0 | 0 | 0.5 | 0 | 0 | 0.5 | 0 | 0 | 0 | 0.25 | 0.25 | 0 | 0 |
| b3.0 | 0 | 0.5 | 0 | 0 | 0 | 0.5 | 0 | 0 | −0.25 | −0.25 | 0 | 0 |
| a4.0 | 0 | 0 | 0.25 | −0.25 | 0 | 0 | 0.5 | 0 | 0 | 0 | 0.25 | 0.25 |
| b4.0 | 0 | 0 | 0.25 | −0.25 | 0 | 0 | 0 | 0.5 | 0 | 0 | −0.25 | −0.25 |
| a5.0 | 0 | 0 | 0 | 0 | 0.25 | −0.25 | 0 | 0 | 0.5 | 0 | 0 | 0 |
| b5.0 | 0 | 0 | 0 | 0 | 0.25 | −0.25 | 0 | 0 | 0 | 0.5 | 0 | 0 |
| a6.0 | 0 | 0.01 | 0 | 0 | 0 | 0.01 | 0.25 | −0.25 | 0 | 0 | 0.5 | 0 |
| b6.0 | 0 | 0.01 | 0 | 0 | 0 | 0 | 0.25 | −0.25 | 0 | 0 | 0 | 0.5 |

TABLE 2

| in | e0.0 | e1 + d1 | e2.0 | d2.0 | e3.0 | d3.0 | e4.0 | d4.0 | e5.0 | d5.0 | e6.0 | d6.0 |
|---|---|---|---|---|---|---|---|---|---|---|---|---|
| e0.0 | 1 | 0 | −0.5 | 0.5 | 0 | 0 | 0 | 0 | 0 | 0 | 0 | 0 |
| e1 + d1 | 0 | 1 | 0 | 0 | −0.5 | 0.5 | 0 | 0 | 0 | 0 | 0 | 0 |
| e2.0 | −0.5 | 0 | 0.5 | 0 | 0 | 0 | −0.25 | 0.25 | 0 | 0 | 0 | 0 |
| d2.0 | 0.5 | 0 | 0 | 0.5 | 0 | 0 | −0.25 | 0.25 | 0 | 0 | 0 | 0 |
| e3.0 | 0 | −0.5 | 0 | 0 | 0.5 | 0 | 0 | 0 | −0.25 | 0.25 | 0 | 0 |

TABLE 2-continued

| in | e0.0 | e1 + d1 | e2.0 | d2.0 | e3.0 | d3.0 | e4.0 | d4.0 | e5.0 | d5.0 | e6.0 | d6.0 |
|---|---|---|---|---|---|---|---|---|---|---|---|---|
| d3.0 | 0 | 0.5 | 0 | 0 | 0 | 0.5 | 0 | 0 | −0.25 | 0.25 | 0 | 0 |
| e4.0 | 0 | 0 | −0.25 | −0.25 | 0 | 0 | 0.5 | 0 | 0 | 0 | −0.25 | 0.25 |
| d4.0 | 0 | 0 | 0.25 | 0.25 | 0 | 0 | 0 | 0.5 | 0 | 0 | −0.25 | 0.25 |
| e5.0 | 0 | 0 | 0 | 0 | −0.25 | −0.25 | 0 | 0 | 0.5 | 0 | 0 | 0 |
| d5.0 | 0 | 0 | 0 | 0 | 0.25 | 0.25 | 0 | 0 | 0 | 0.5 | 0 | 0 |
| e6.0 | 0 | 0 | 0 | 0 | 0 | 0 | −0.25 | −0.25 | 0 | 0 | 0.5 | 0 |
| d6.0 | 0 | 0 | 0 | 0 | 0 | 0 | 0.25 | 0.25 | 0 | 0 | 0 | 0.5 |

What is claimed is:

1. An apparatus configured to correct multi-phase signals for detecting a position of an object and to obtain a phase corresponding to the position of the object, the apparatus comprising:
a correcting unit configured to correct the multi-phase signals with error coefficients, respectively;
a phase calculating unit configured to perform calculation for the corrected multi-phase signals to obtain the phase;
a regression unit configured to perform regression for the calculated phases using a regression expression to obtain reference phases;
a Fourier transform unit configured to respectively perform Fourier transform for the corrected multi-phase signals whose phases having been respectively changed into the reference phases; and
an updating unit configured to update, using Fourier coefficients obtained by the Fourier transform unit, the error coefficients respectively corresponding to the Fourier coefficients,
wherein the updating unit is configured to update the error coefficients if a regression error in the regression performed by the regression unit satisfies a predetermined condition.

2. An apparatus according to claim 1, wherein:
the multi-phase signals are two-phase signals, and
the phase calculating unit is configured to obtain the phase based on a ratio of the two-phase signals corrected by the correcting unit.

3. An apparatus according to claim 1, wherein the regression is a linear regression.

4. An apparatus according to claim 1, wherein the updating unit is configured to update the error coefficients if the regression error is less than a prestored value.

5. An apparatus according to claim 4, wherein the updating unit is configured to replace the prestored value with the regression error based on which the error coefficients are updated.

6. An apparatus according to claim 1, further comprising:
a memory configured to store the phase obtained by the phase calculating unit,
wherein the updating unit is configured to update the error coefficients using the Fourier coefficients obtained for a range of the stored phases where the regression error is minimum.

7. A method of correcting multi-phase signals for detecting a position of an object to obtain a phase corresponding to the position of the object, the method comprising the steps of:
correcting the multi-phase signals with error coefficients, respectively;
performing calculation for the corrected multi-phase signals to obtain the phase;
performing regression for the calculated phases using a regression expression to obtain reference phases;
respectively performing Fourier transform for the corrected multi-phase signals whose phases having been respectively changed into the reference phases; and
updating, using Fourier coefficients obtained by the Fourier transform, the error coefficients respectively corresponding to the Fourier coefficients,
wherein the updating step updates the error coefficients if a regression error in the regression satisfies a predetermined condition, and
wherein each of the steps is performed by a processing device.

* * * * *